United States Patent [19]

Hewitt

[11] 4,177,570

[45] Dec. 11, 1979

[54] APPARATUS FOR GAUGING AND PRICING FASTENERS

[76] Inventor: Allan R. Hewitt, 17 S. Church St., DuBois, Pa. 15801

[21] Appl. No.: 894,904

[22] Filed: Apr. 10, 1978

[51] Int. Cl.² .............................................. G01B 5/02
[52] U.S. Cl. ................................. 33/174 R; 33/199 R
[58] Field of Search .................. 33/1 B, 111, 168 R, 33/174 R, 174 B, 178 B, 199 R

[56] References Cited

U.S. PATENT DOCUMENTS

| | | | |
|---|---|---|---|
| 1,860,174 | 5/1932 | Cronk | 33/168 R |
| 2,981,005 | 4/1961 | Moe | 33/178 B |
| 3,230,628 | 1/1966 | Hite | 33/199 R |
| 3,238,629 | 3/1966 | Hurwitz | 33/174 R |
| 3,557,463 | 1/1971 | Perry et al. | 33/174 B |
| 3,846,915 | 11/1974 | Obermark et al. | 33/174 B |

FOREIGN PATENT DOCUMENTS 747114  11/1966  Canada ................................ 33/199 R Primary Examiner—Richard R. Stearns
Attorney, Agent, or Firm—Reed, Smith, Shaw & McClay

[57] ABSTRACT

Apparatus for determining the gauge and price of fasteners such as bolts and screws. The apparatus includes an array of channels from which the gauge is determined, and further includes a plurality of pages that cooperate with the channels to determine the price of a fastener.

8 Claims, 2 Drawing Figures

APPARATUS FOR GAUGING AND PRICING FASTENERS

BACKGROUND OF INVENTION

1. Field of the Invention

The present invention relates to gauges for fasteners and, more specifically, to devices for gauging and pricing fasteners.

2. Description of the Prior Art

Various indexes, scales, gauges and the like for determining the size of bolts and similar fasteners are known in the prior art. U.S. Pat. Nos. 447,475; 2,679,697; 2,728,145; 2,928,181; 2,981,005; 3,218,724; and 3,858,325 are considered to be generally illustrative of the art. These devices are generally intended for application by the user to assist in the performance of routine work. Therefore, these devices generally afford no information regarding the purchase price of specific fasteners.

When fasteners are sold in bulk quantities, typically, both seller and purchaser are familiar with the fastener and are aware of its price. However, when fasteners are sold in limited quantities or individually, they are usually sold over-the-counter as in hardware stores. Under these circumstances, the seller and/or purchaser may be unable to precisely identify the fastener from its physical appearance and may be unfamiliar with its price. Moreover, even if gauges and similar mechanisms known it the prior art were used to determine the sizes of the fastener, the seller still had to generally refer to an independent source to determine the correct price. Accordingly, there existed a need for a fastener gauge and price calculator for efficiently gauging and pricing fasteners sold over-the-counter as in hardware stores and the like.

SUMMARY OF THE INVENTION

In accordance with the present invention, a fastener gauge and price calculator includes a base portion having an array of channels corresponding to various fastener gauges. Index members are flexibly bound to the base portion and cooperate with the array of channels to calculate the price of the fastener.

Preferably, the index members are in the form of pages that are flexibly bound to the base portion; each page corresponding to a channel of the array such that, for each fastener gauge, the price of a particular fastener is indexed on the page according to the type and length of the fastener.

Also preferably, the fastener gauge and price calculator further includes an array of threaded members fastened to an apron portion of the base member. The array of threaded members are for use in sizing and pricing spacing members, such as washers, and fastening members, such as nuts.

Also preferably, the base member further includes a plurality of holes and a fastener price index associated with each hole. The holes are used to size additional types of fasteners, such as screws, and the respective fastener price index is used to determine the price of the corresponding fastener.

Other details, objects and advantages of the invention will become apparent as the following description of the presently preferred embodiments thereof proceeds.

BRIEF DESCRIPTION OF THE DRAWINGS

In the accompanying drawings are shown present preferred embodiments of the invention in which.

DESCRIPTION OF THE PREFERRED EMBODIMENTS

Figure 1:
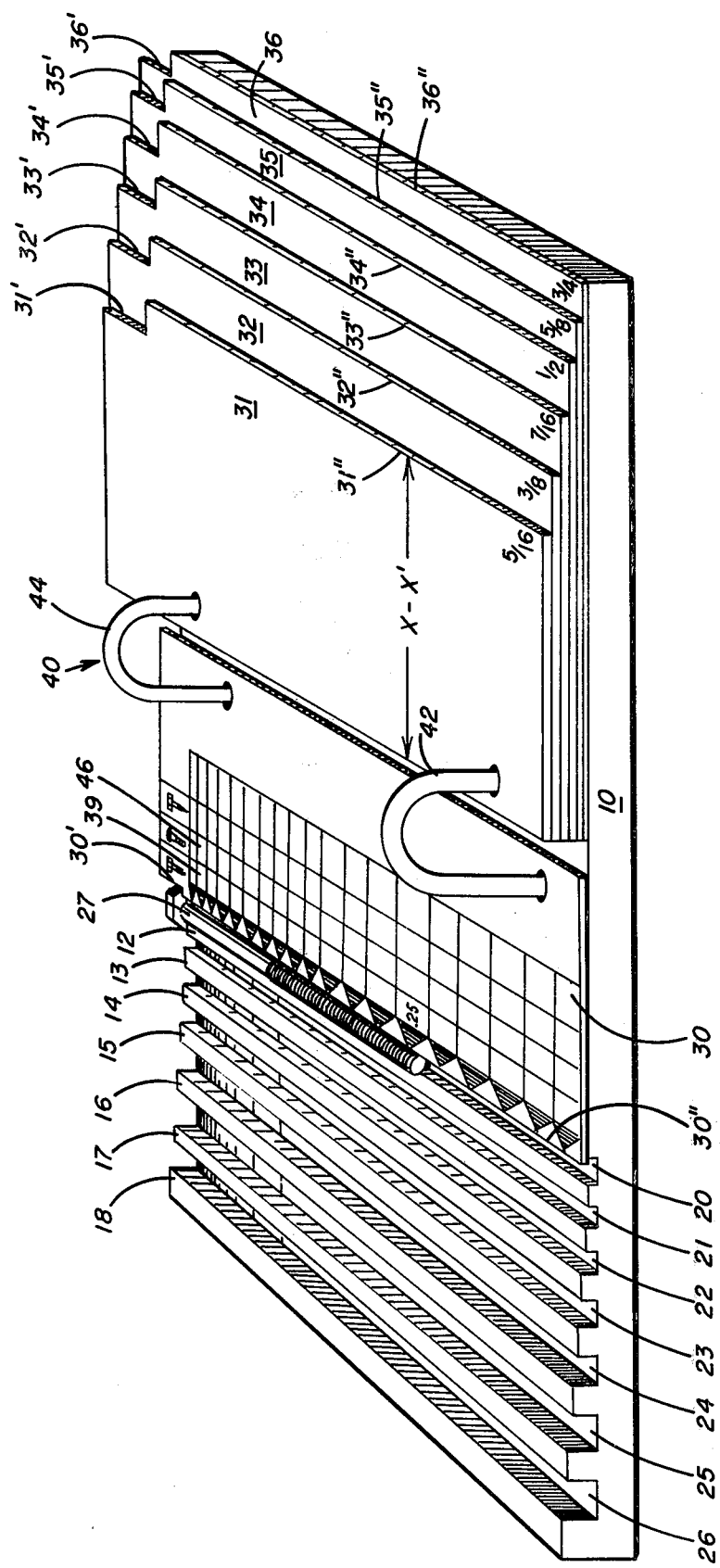
FIG. 1 is a perspective of the disclosed fastener gauge and price calculator.

FIG. 1 shows a perspective view of one embodiment of the fastener gauge and price calculator herein disclosed. The fastener gauge and price calculator includes a base member 10 of a generally rectangular shape and having a longitudinally parallel array of elevated portions 12-18 on one half thereof. Adjacent members of the longitudinally parallel array of raised portions are laterally spaced such that channels 20-26 are formed therebetween. The lateral spacing of the portions 12-18 is such that the width of channels 20-26 coincides with the standard gauge of a particular type of fastener with indicia of the precise gauge located in or near the channel. For example, FIG. 1 shows that channel 20 corresponds to a standard size hex bolt 27.

To determine the gauge of the fastener, the fastener is longitudinally placed in the narrowest channel that will accommodate it. The fastener gauge is then read from the indicia located in or near the channel. It is preferred that base member 10 be comprised of a plastic material although other materials such as wood, wood derivative products, or metal are also suitable. It is also preferred that portions 12-18 form an integral part of base member 10, although portions 12-18 can also be comprised of separate longitudinal members attached to the rectangular portion of base 10 as, for example, by glue or other suitable means.

Figure 2:
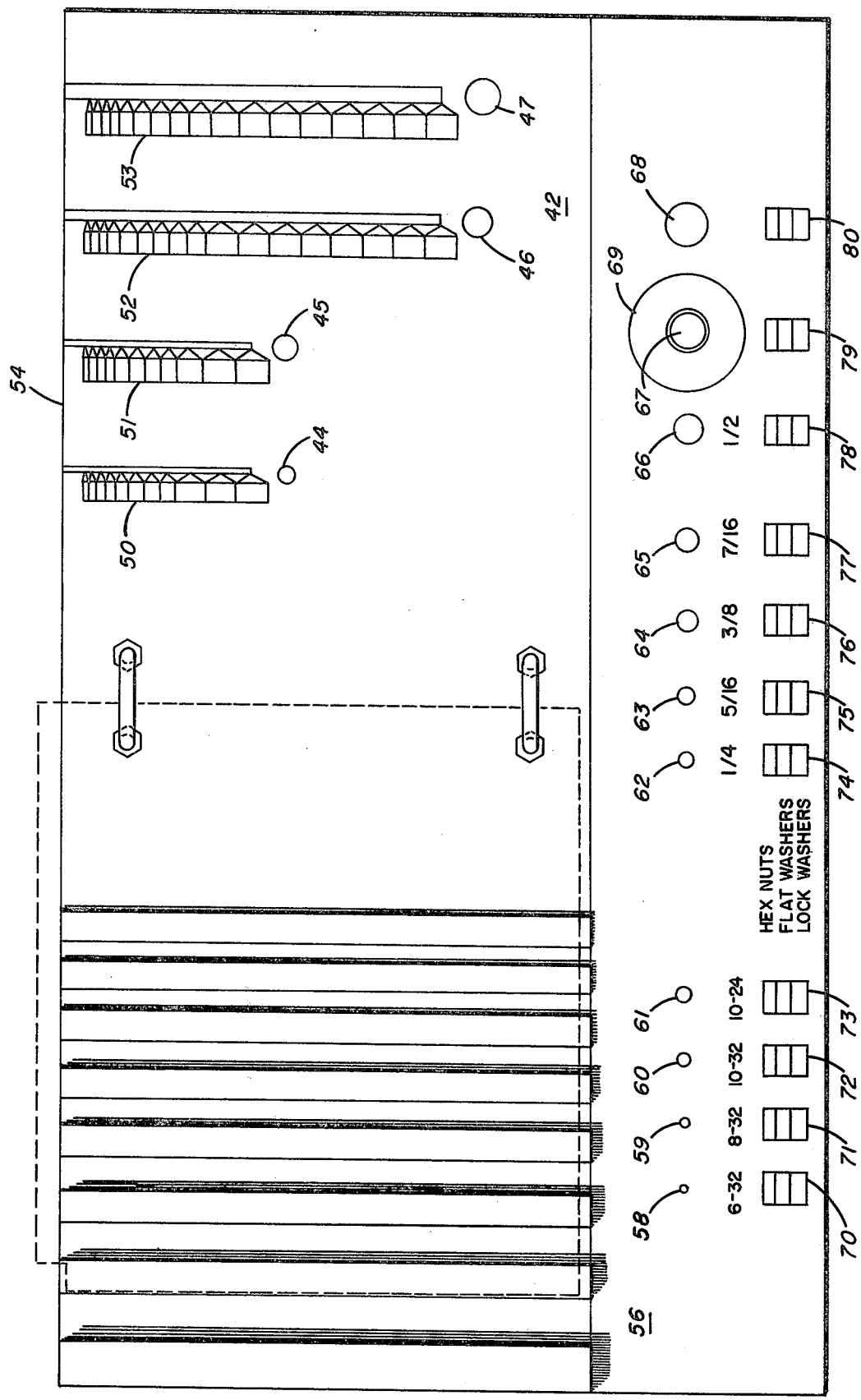
FIG. 2 is a plan view of a modified base member for the disclosed fastener gauge and price calculator.

The fastener gauge and price calculator further includes indexing means which, for the preferred embodiment, comprise page members 30-36 that cooperate with respective channels 20-26 so as to index the price of a selected gauge of fastener according to the type and length of the fastener. The width of each page is such that, when pages 30-36 are flexibly mounted to base member 10 by a binding means 40 which, in the embodiment of FIG. 1, includes U-bolts 42 and 44 that extend through respective holes in base member 10 and pages 30-36. Accordingly, pages 30-36 can assume a first position in which they extend from binding means 40 and laterally away from channels 20-28 as illustrated in FIG. 1 by pages 31-36. Also, pages 30-36 can assume a second position in which they extend from binding means 40 and laterally toward channels 20-26 as illustrated by page 30. As shown in FIGS. 1 and 2, pages 30-36 extend beyond the top edge of base member 10, the extended portions of pages 30-36 including notch sections 30'-36'. Notch sections 30'-36' are of sufficient size so as to accomodate the head portions of various types of fasteners of the corresponding gauge when pages 30-36 are in the second portion. Preferably, pages 30-36 are comprised of a plastic material or a wood derivation products as, for example cardboard.

The various prices for different lengths of fasteners of one or more types are indicated on the major surface of each of pages 30-36 which faces upwardly when the page is in the second position. Preferably, the various prices for each type of fastener are arranged in vertical columns according to the various types of fasteners that are to be gauged by the device with the type of fastener for each column being indicated on the extended portion of the pages 30–36. For example, prices of hex bolts are arranged according to length in vertical column 39 while prices of stove bolts are arranged according to length in vertical column 46. When pages 30–36 are comprised of a plastic material, the fastener prices are displayed on tables that adhere to the plastic material. Where pages 30–36 are comprised of a wood derivative product, such as cardboard, the fastener prices can be displayed on adherent labels or, alternatively, can be printed directly on pages 30–36.

The lateral dimension (x-x$^1$) of each of the pages 30–36 is determined in accordance with the lateral distance between binding means 40 and a corresponding one of channels 20–26 such that when the pages are in the second position; the margin 30"–36" of the pages 30–36 opposite binding means 40 lies parallel adjacent to the fastener gauge channel corresponding to the page. For example, the lateral dimension (x-x') of page 30 is such that when page 30 is in the second position as shown in FIG. 1, the margin 30" lies parallel adjacent to channel 20.

Accordingly, when fastener 27 is properly located in channel 20, page 30 cooperates with fastener 27 to determine the fastener price according to the length and type of the fastener. As shown in FIG. 1, hex bolt 27 is longitudinally positioned in channel 20 such that the underside of the head is flush against the top edge of base 10. Page 30, which corresponds to the gauge of channel 20, is then placed in the second position so that margin 30" lies parallel adjacent to channel 20. The end of hex bolt 27 then indicates the correct row of the price matrix on page 30 and the price is read from the column of that row corresponding to hex bolts.

Preferably, the lateral arrangement of said elevated portions is such that the width of channels 20–26 respectively is progressively larger. Also preferably, elevated portions 12–18 respectively are of progressively increasing height. The increment in height between adjacent members of the array of raised portions 12–18 is generally within the range of the thickness of the individual pages 30–36. Accordingly, when the pages 30–36 are placed in the second position, the major surfaces of the pages 30–36 are generally parallel to each other and to the major plane of base member 10. Therefore, the margin of each page 30–36 is advantageously adjacent the corresponding channel 20–26 with the major surface of the page in substantially parallel relation to the major plane of base 10 such that the correct fastener length and price may be more easily read from pages 30–36.

FIG. 2 shows a modification of the base member of FIG. 1 whereby the fastener gauge and price calculator can determine the size and/or price of additional types of fasteners. In FIG. 2, a modified base member 42 further includes a group of holes 44–47 the diameter of which are sized in accordance with standard sizes of selected types of fasteners as, for example, machine screws, flat head screws, and round head screws. Labels 50–53 are associated with holes 44–47 respectively and display the prices of the various fastener types in matrix form in accordance with standard lengths of the various fastener types. As shown in FIG. 2, labels 50–53 include only a single column and, hence, are intended to price only a single type of fasteners. However, it will be apparent that additional types of fasteners could be priced by adding additional columns to lables 50–53 where this is necessary or desirable.

The fasteners are gauged in accordance with modified base member 42 by inserting the fastener along its longitudinal axes into the smallest hole in which it can be placed. Once the gauge has been determined, the price of the fastener is determined by aligning the longitudinal axis of the fastener with the associated label and reading the price corresponding to the type and length of the fastener.

Preferably, instructions are provided on modified base members 42 for proper measurement of the length of the fasteners that are to be gauged and priced in accordance with holes 44–47 and lables 50–53. For example, instructions on modified base member ½ direct that flat head screws are to be measured by aligning the top of the screw head with edge surface 54 of base 42 while roundhead screws are measured by aligning the underside of the screw head with edge surface 54. Preferably, these instructions are permanently etched in base member 42.

Preferably, base member 42 includes a further modification for measuring and pricing fasteners. As shown in FIG. 2, base member 42 includes an apron section 56 that extends over the lateral dimension of base member 42 and below the area of base member 42 covered by pages 30–36 in both the first and second positions. Apron section 56 includes an array of threaded studs 58–68 that project upwardly from the major plane of apron section 56. Threaded studs 58–68 are of standard gauge and thread size such that correlative fasteners such as nuts and washers may be sized by placement over the largest of threaded studs 58–68 that the correlative fastener can accomodate. The arrangement of threaded studs 58–68 relative to each other is such that there is sufficient room between adjacent studs to allow for placement of correlative fasteners thereover. For example, washer 69 is sized by placing it over threaded stud 67, the largest threaded stud that washer 69 can accomodate. As is also shown, threaded studs 67 and 68 are disposed relative to one another such that a washer correlative to either stud can be placed therebetween.

Price labels 70–80 correspond to threaded studs 58–68 respectively. Prices on labels 70–80 are arranged in a single column according to the gauge of the correlative fastener with each price of the column corresponding to a different type of fastener. Once the fasteners have been properly gauged according to threaded studs 58–68, the fastener price can be read from the corresponding label 70–80 in accordance with the fastener type. For example, the price of flat washer 69 is taken from the price for flat washers in the column corresponding to the gauge of stud 67.

Accordingly, there has been described a fastener gauge and price calculator which is particularly suited to sizing and pricing fasteners that are sold individually or in small quantities. Furthermore, the disclosed fastener gauge and price calculator requires no prior knowledge of or familiarity with the fasteners and is useful to even inexperienced persons for quickly and accurately sizing and pricing fasteners.

Which certain preferred embodiments of the invention have been shown and described, it is to be understood that the invention is not limited thereto, but may be otherwise variously embodied within the scope of the following claims.

I claim:

1. Apparatus for gauging and pricing fastening devices, said apparatus comprising:
   a base member that includes an array of elevated portions forming therebetween an array of parallel channels, each of said channels corresponding to a predetermined fastener gauge such that said parallel channels gauge a fastener disposed in one of said parallel channels;
   a plurality of indexing pages that respectively cooperate with a single corresponding parallel channel of said base member to measure the axial length of a fastener disposed in the corresponding parallel channel; and
   means for binding said indexing pages to said base member such that said indexing pages can be selectively turned between first and second positions that oppose said base portion on opposite sides of said binding means, the major exposed surface of indexing pages in one of said positions displaying the price of the fastener in accordance with the measured length.

2. The apparatus of claim 1 wherein, for pages in the one position, the page margin oppositely disposed from the binding means is parallel adjacent to the corresponding one of said channels.

3. The apparatus of claim 2 wherein the elevated portions of said base member are laterally arranged such that the adjacent channels formed therebetween are progressively wider.

4. The apparatus of claim 3 wherein the elevated portions are progressively higher such that, when said pages are placed in said one position, the major surfaces of the pages are substantially parallel to the major plane of the base member.

5. The apparatus of claim 4 further comprising:
   labels that display the fastener prices, said labels being adherent to the surface of said pages.

6. The apparatus of claim 4 wherein the pages are composed of a wood derivative product with the fastener prices being printed directly thereon.

7. The apparatus of claim 4 wherein said base member further includes holes in the major surface thereof for determining the size of additional types of fasteners, said apparatus further comprising:
   means for pricing the additional types of fasteners that are sized in accordance with the holes in the major surface of the base member.

8. The apparatus of claim 4 wherein said base member includes an apron portion, said apparatus further comprising:
   an array of studs anchored in the apron portion of said base member for determining the gauge of types of fasteners correlative to said studs; and
   means for pricing the correlative fasteners sized in accordance with said studs.

* * * * *